United States Patent Office

3,488,216
Patented Jan. 6, 1970

3,488,216
METHOD FOR GLAZING
Francis W. Martin, Painted Post, N.Y., assignor to Corning Glass Works, Corning, N.Y., a corporation of New York
No Drawing. Filed June 8, 1965, Ser. No. 462,423
The portion of the term of the patent subsequent to Oct. 8, 1985, has been disclaimed
Int. Cl. C03c 9/00, 17/04
U.S. Cl. 117—125  8 Claims

ABSTRACT OF THE DISCLOSURE

A method and products resulting therefrom, for glazing ceramic materials and particularly borosilicate glass of a coefficient of expansion of less than about $70 \times 10^{-7}$, whereby a frit of a thermally devitrifiable sealing glass, which undergoes substantially immediate devitrification upon being heated, is applied to said ceramic and is heated to the maturing temperature for a time sufficient to form a glaze.

---

The present invention relates to a new method for glazing ceramic articles. It is particularly concerned with the glazing of relatively low expansion ceramic materials with higher expansion glazing compositions in such a way that loss of impact strength is minimized.

The term "glazing" as used in the present specification refers generally to the coating of ceramic materials with films or layers of a vitreous material. Such coatings include both clear glazes and opacified glazes or enamels.

The term "coefficient of expansion" is stated in units per ° C. whenever used in the present specification and claims and is an average value over a selected temperature range. While the actual effective range is below the setting point of a glass, the usual practice is to state the average expansion coefficient over a temperature range of from 0° to 300° C., there usually being no more than a small difference in values, for example, about 15%. Therefore, unless otherwise indicated, given coefficients of expansion values are for the temperature range of from 0° to 300° C.

It is common practice in the ceramic art to apply glazes or enamels to glass or other ceramic ware for decorative purposes, to form indicia or marks on the surface of the ware, or to provide a protective surface coating. The coating material is based on a low melting vitreous material referred to as a frit. Enamels in particular will ordinarily contain a mill addition which does not fuse or react with the frit during maturing of the enamel, but remains insoluble as an opacifying or coloring agent. The coating material is usually prepared in finely divided form as a slip or suspension and applied by such well-known practices as silk screening and stenciling.

The ceramic glazing art has long appreciated the need for a reasonably close match between the expansion characteristics of a glazing frit and the ceramic surface being glazed in order to avoid a tendency for the higher expansion glaze to check or spall as it cools. It is recognized that the degree of tolerable mis-match can be extended somewhat by employing very thin coatings. However, this practice is of limited effectiveness and frequently tends to defeat the primary purpose of applying a coating, namely, formation of a protective or decorative layer on the surface of the substrate.

Even where the expansion mis-match is not sufficient to cause visible damage, it may be sufficient to reduce drastically the inherent mechanical strength of the glazed article, possibly due to microchecks. This problem is particularly serious in the case of thin blown glass ware, such as carafes, pitchers and the like. For example, attempts to apply commercially available decorating enamels to such articles produced from a borosilicate glass having a thermal coefficient of expansion of about $35 \times 10^{-7}$ have resulted in such weakening of the glass wall to inside impact that the article may be broken by merely striking the inside of the wall with a spoon during stirring.

Impact resistance may be stated in terms of unit force required to break a glass article, or portion thereof, and this property may be measured in a swinging or falling ball device. In such a test, the impact resistance of a freshly blown piece of glass ware is variable, but well over a standard of 0.6 unit. Surface abrasion with 150 grit abrasive paper, adapted to simulate service treatment, lowers this resistance to from 0.1 to 0.2 unit. Application of a commercial decorating enamel to the unabraded ware reduces the resistance still further to under 0.05 unit. While there may be no readily visible crazing or spalling in the enamel, it may be assumed that a network of microscopic checks or cracks exists at the interface.

There are available numerous vitreous materials suitable for enameling ferrous metals and decorating soda lime type glasses which have thermal coefficients of expansion on the order of $80$–$120 \times 10^{-7}$. However, as indicated earlier, the situation is quite different in the case of materials, such as borosilicate glasses, having relatively low expansion coefficients in the range of from about 30 to $50 \times 10^{-7}$ and other materials having even lower expansion coefficients, such as 96% silica glasses, fused silica, and low expansion glass ceramic material. It is possible to modify the compositions of the higher expansion frit materials to produce a material of lower expansion, but this customarily increases the firing or maturing temperature to such an extent that glass ware tends to be deformed or warped during the firing process.

I have now discovered that a chemical interaction occurs between a vitreous frit and a ceramic substrate material during the firing or maturing step. I have further found that this interaction, and the resulting interface material formed, is an important factor in the problem of diminished impact strengths, and that the latter can be greatly minimized by avoiding such interaction during the firing operation.

Based on these and other discoveries, my invention provides a novel method of glazing wherein loss of impact strengths in the glazed article is minimized. The method comprises applying a glazing frit to a low expansion substrate and then maturing the glaze without appreciable chemical interaction between the glazing material and the ceramic surface to which it is applied. Interfacial reaction between the glaze and the substrate is substantially avoided by maturing the glaze in such a way that the glaze devitrifies substantially immediately upon being cured. This may be accomplished by using glazing frits of special composition which undergo substantial devitrification immediately upon being heated to temperatures at which the glaze is matured.

In carrying out my invention, I prefer to employ as a glazing material a thermally devitrifiable sealing glass that crystallizes very rapidly upon reaching a temperature at which the glass softens and fusion bonds to an underlying surface. The chemical interaction which normally occurs between a molten glazing frit and the underlying ceramic surface is thereby inhibited, provided that the characteristic crystal phase separation of a thermally devitrifiable glass occurs concurrently with maturing of the material as a glaze. It appears that separation of the crystal phase effectively alters the reactive nature of the frit and thereby prevents the undesirable chemical interaction with the substrate material. Such rapid crystallization does not permit the flow normally considered necessary for sealing purposes, but does not interfere with effective glaze or enamel formation.

Glasses which may be used in the present invention are primarily characterized by the fact that they undergo rapid devitrification during thermal maturing, so that reaction between the glaze and the glass substrate is inhibited. The devitrification of such sealing glasses during glaze formation is essentially of the nucleated type which precipitates a crystalline phase of small, substantially uniformly distributed crystals throughout the glaze.

The sealing glasses are further characterized by a change in physical characteristics upon devitrification, the glaze taking on the characteristics of the crystalline phase. Especially important is a decrease in coefficient of thermal expansion of the devitrified glaze, preferably of about 20 units, and an increase in viscosity, concurrent with maturing.

Crystallization of the present type is readily distinguished from that encountered in conventional opal glasses in that opacified glasses normally undergo no substantial change in physical properties as a result of crystal formation, other than a change in light transmission resulting from the precipitation of a small crystalline phase.

The glasses used in the invention are also characterized by the substantially immediate formation at maturing temperatures in the range of from about 500° to 650° C. of a crystalline lead titanate phase. The glasses may be treated to form a devitrified glaze by heating at from 500° to 650° C. for a short time. Crystallization commences substantially immediately upon heating the frit to its maturing temperature and will be sufficiently advanced after from a few minutes to about a half hour to accomplish the desired improvement in impact strength in the glazed article. The period of heating will of course vary depending upon the composition of the frit and the temperature at which it is heated.

Any glass glazing composition which devitrifies substantially immediately upon being matured may be employed in this process. Maturing here refers to thermal treatment of the frit to soften the glass and form a continuous glaze which thoroughly wets the substrate and becomes tightly bonded to it upon cooling.

A class of glasses useful in the present invention comprises by weight on an oxide basis from 60% to 76% PbO, from 12% to 18% $TiO_2$, at least 2% $B_2O_3$ and at least 5% $SiO_2$, the total of $B_2O_3$ and $SiO_2$ being from 12% to 20%.

The glasses may also contain up to 20% of other divalent metal oxides, preferably ZnO, BaO or mixtures thereof. Where such optional divalent metal oxide additions are made, the total of PbO and the divalent metal oxide(s) is still maintained in the range of from 60% to 76%.

In some cases the addition of a small amount of alumina ($Al_2O_3$), about 2% has been found to result in improved glazed articles.

Glasses of the above composition are melted, quenched, ground and applied to the glass substrate according to standard procedures. The ground glass may, for example, be mixed with a suitable vehicle to form a slip or suspension and is then applied by silk screening or other conventional technique.

Glasses of the above composition, containing divalent metal oxide additions besides PbO, generally devitrify with sufficient speed when matured that interfacial reaction is reduced and loss of impact strength is minimized.

In some cases it has been found desirable to add a small amount of crystalline lead titanate to the frit during milling. The "seeding" of the glass with lead titanate crystals promotes the formation of the desired crystalline lead titanate phase. Just a small crystalline lead titanate addition, on the order of about 1% by weight, is sufficient to accomplish this purpose, although larger amounts may be used.

It should be noted, however, that in many cases the glass frit will already contain a sufficient amount of crystalline lead titanate and no further addition is required. Thus, where the quenching of the melt has been conducted so as to permit a crystalline lead titanate phase to remain, the separate addition of crystals to the frit may be unnecessary.

The glass substrates glazed in accordance with the present invention generally have coefficients of thermal expansion below $70 \times 10^{-7}$ and preferably below about $50 \times 10^{-7}$. Borosilicate glasses having expansions in the neighborhood of $35 \times 10^{-7}$ are particularly suited to glazing according to the present method to produce products having impact strengths superior to those obtained with commercial enamels applied by standard procedures.

The resulting glazed articles comprise a ceramic substrate, a devitrified glaze bonded to the surface of the substrate and an interface between the substrate and the glaze which is substantially free of detrimental interfacial reaction between the two. To be sure, there is some reaction between the glaze and the ceramic body, but the rapid formation of a substantial crystalline phase in the glaze minimizes such reaction to the extent that the impact strength of the product is maintained above serviceable levels. The exact amount of crystalline phase present in the devitrified glaze will vary depending on the composition of the frit and the temperature and time period of maturing the frit. Ordinarily, however, the crystalline phase will constitute more than 50% and usually on the order of 60% of the devitrified glaze. The reduction in interfacial reaction between glaze and substrate, achieved by the present invention, may be observed by removing the glaze, by dissolving or other producedure, and inspecting the substrate. Where the compositions and procedures of this invention are employed to effect rapid devitrification of the glaze as it is matured, little or no crazing of the substrate is apparent. Where the invention is not followed and the glaze is not devitrified concurrently with its being matured, a crazed pattern is clearly evident on the surface of the exposed substrate.

It has also been observed that an iridized metal oxide coating between a glaze and a ceramic substrate eliminates crazing at the interface and results in articles of improved impact resistance. This lends further evidence in support of the discovery that the improvement in impact resistance in glazed articles produced by the present invention is based at least in part on the reduction in interfacial reaction between the glaze and the substrate.

The invention is further described with respect to specific embodiments thereof which are intended to be illustrative rather than limiting.

EXAMPLE I

A raw material batch composed of red lead, litharge, zinc, boric acid, sand and titania, was mixed in proportions calculated to yield about 6 pounds of a melted glass frit having the following composition calculated on the oxide basis in weight percent: 63% PbO, 10% ZnO, 7.5% $B_2O_3$, 7.5% $SiO_2$ and 12% $TiO_2$. The batch was melted in a platinum crucible by firing for about 6 hours at a temperature of about 1250° C. The molten frit was then quenched by pouring between rotating chilled metal rollers. The quenched frit was then pulverized, mixed with a suitable vehicle for screening on a glass surface and applied to glass test pieces of known expansion coefficient characteristics. These samples were fired at 620° C. for ½ hour to mature the frit as a glaze, that is to soften the glass particles and cause them to form a continuous glassy coating bonded to the underlying surface. At the same time, the frit glass was thermally crystallized by separation throughout the coating of a crystal phase which tests indicated to be predominantly a lead titnate type of crystal. The glazed samples thus produced were subjected to stress tests designed to show the degree of expansion mis-match existing between the matured glaze and the glass to which it was applied and bonded. These tests indicated the matured glaze to have an average coefficient of expansion below its setting point of about 420° C. of about $46 \times 10^{-7}$.

A suspension of the frit just described was applied by conventional glazing techniques to the surface of a commercial borosilicate glass having an expansion of about $33 \times 10^{-7}$. The frit coated glass body was then fired as before at 620° C. for ½ hour and then cooled. There was no evidence of spalling or checking despite the apparent expansion mis-match. Nevertheless, when the inside or uncoated surface of the glass was subjected to a standard impact test, the body broke with an impact of about 0.05 standard unit as compared to 0.02–0.04 unit for commercially enameled glass of this type and 0.6 unit for uncoated and untreated glass. When the glaze was removed from the glass surface with a hot alkali solution, it was found that an interface layer between the glaze and the underlying glass became severely crazed as the enamel was dissolved.

EXAMPLE II

In this test, the frit of Example I was prepared for application in the manner of that example with the exception that about 1% of crystalline lead titanate was intimately mixed with the frit during the pulverizing step. This suspension was then applied as a coating to a glass article blown from a commercial borosilicate glass having an expansion of about $33 \times 10^{-7}$. When the coated ware was fired at 620° C. for ½ hour to mature the glaze, it was observed that the frit stiffened due to crystallization almost immediately upon softening and bonding to the glass. Thus, there was essentially no flow such as is required for adhesive sealing between parts, but this caused no apparent interference with effective maturing of the glaze. When the glazed article was impact tested as before, a considerable improvement in impact resistance was noted, thus indicating that "seeding," or nucleating, of the frit with a minor amount of the anticipated crystal phase lead titanate, appeared to hasten crystallization and concomitantly minimize interaction between the frit and the glass substrate.

EXAMPLES III AND IV

Glazing frits III and IV having the following oxide compositions as calculated from the batch in weight percent were produced in accordance with the mixing and melting practice described in Example I:

FRIT

|  | III | IV |
| --- | --- | --- |
| PbO | 63 | 72 |
| ZnO | 10 |  |
| $B_2O_3$ | 5.5 | 4 |
| $SiO_2$ | 6.5 | 8 |
| $Al_2O_3$ | 2 |  |
| $TiO_2$ | 13 | 15 |

The compositions were pulverized and mixed with a vehicle to form a glazing slip or suspension suitable for screening on glass ware surfaces. The glazing suspensions thus prepared were applied to glass articles of the type described in Example II. The articles were then fired in accordance with varying schedules adapted to produce glazed ware, and the resulting articles were then impact tested in the usual manner.

Glass ware coated with the suspension of frit having composition III was fired in accordance with two schedules. One set of glass articles was fired at 620° C. for ½ hour for comparative purposes. The ware thus glazed had an impact resistance of about 0.40 unit. A second set of ware was fired in a decorating lehr wherein the peak temperature was about 650° C., but the peak temperature was maintained only momentarily and thereafter the temperature was dropped to about 550° C., in about 15 minutes. The impact resistance of ware fired on this schedule was rather lower, about 0.12 impact unit. However, service tests on glass were decorated in this manner indicated the ware to be quite serviceable with reported breakage being relatively minor.

During the firing on each schedule, it was observed that the glazes matured and set up due to crystallization in essentially the same manner as the "seeded" glaze in Example II. In other words, the glazes set up essentially immediately and evidenced no indication of the fluidity or flow properties normally observed in sealing glasses.

The same type of glass article as used with composition III was glazed with the frit having composition IV in accordance with the glazing procedure and firing schedules described with reference to frit III. It was observed that the frit behaved quite similarly to frit III during firing and that impact tests on the glazed ware were somewhat better than those measured on the ware coated with frit III. Of particular interest was the observation that comparable srengths to those obtained with the ½ hour firing schedule could be obtained with the shorter lehr scedule by "seeding" frit IV in the manner described in Example II, that is with an addition of about 1% of crystalline lead titanate during milling.

What is claimed is:

1. A method for glazing a preformed ceramic body of borosilicate glass having a coefficient of thermal expansion of below about $70 \times 10^{-7}$, so as to minimize the loss of impact strength in the resulting glazed article, comprising
    applying to the surface of said body a frit of a thermally devitrifiable sealing glass comprising from 60% to 76% PbO, from 12% to 18% $TiO_2$, at least 2% $B_2O_3$ and at least 5% $SiO_2$, the total of $B_2O_3$ and $SiO_2$ being from about 12% to 20%, and
    heating said frit to a temperature in the range of from about 500° to 650° C. whereby devitrification occurs substantially immediately and thereafter maintaining said frit at said maturing temperature for a time sufficient to form said glaze, thereby reducing interfacial reaction between said glaze and said body and producing a glaze having a coefficient of expansion which is compatible with said body.

2. The method of claim 1 wherein said preformed ceramic body is a body of borosilicate glass having a coefficient of thermal expansion on the order of from about 30 to $50 \times 10^{-7}$.

3. The method of claim 1 wherein said frit further comprises a small but effective amount of seeding crystals of lead titanate.

4. The method of claim 1 wherein said frit further comprises up to 20% by weight of another divalent metal oxide, besides PbO, said other divalent metal oxide being selected from the group consisting of ZnO and BaO, the total of divalent metal oxides in the frit, including PbO, being in the range of from 60% to 76%.

5. The method of claim 1 wherein said frit further comprises about 2% by weight of $Al_2O_3$.

6. A glazed article of improved impact resistance comprising
    a ceramic body of borosilicate glass having a coefficient of expansion of below about $70 \times 10^{-7}$,
    a substantially devitrified glaze bonded to the surface of said body, and
    an interface between said body and said glaze, said interface being substantially free from detrimental interfacial reaction between said glaze and said body, said glaze having been formed from a frit comprising from 60% to 76% PbO, from about 12% to 18% $TiO_2$, at least 2% $B_2O_3$, and at least 5% $SiO_2$, the total of $B_2O_3$ and $SiO_2$ being from about 12% to 20%.

7. A glazed article in accordance with claim 6 wherein said glaze contains a major proportion of crystalline lead titanate.

8. The glazed article of claim 6 wherein said body of borosilicate glass has an expansion coefficient on the order of from 30 to $50 \times 10^{-7}$.

References Cited

UNITED STATES PATENTS

| | | | |
|---|---|---|---|
| 3,405,002 | 10/1968 | Martin | 117—125 |
| 2,920,971 | 1/1960 | Stookey | 65—33 X |
| 3,063,198 | 11/1962 | Babcock. | |
| 3,250,631 | 5/1966 | Lusher | 117—125 X |
| 3,258,350 | 6/1966 | Martin et al. | 117—125 X |

FOREIGN PATENTS 254,225  5/1963  Australia.

DAVID KLEIN, Primary Examiner

U.S. Cl. X.R.

106—53